(12) United States Patent
Suzuki

(10) Patent No.: US 7,262,874 B2
(45) Date of Patent: Aug. 28, 2007

(54) PRINTING APPARATUS AND ELECTRONIC CAMERA

(75) Inventor: Takeshi Suzuki, Akiruno (JP)

(73) Assignee: Olympus Optical Co., Ltd., Tokyo (JP)

( * ) Notice: Subject to any disclaimer, the term of this patent is extended or adjusted under 35 U.S.C. 154(b) by 1145 days.

(21) Appl. No.: 09/874,593

(22) Filed: Jun. 5, 2001

(65) Prior Publication Data

US 2002/0051138 A1    May 2, 2002

(30) Foreign Application Priority Data

Jun. 7, 2000  (JP) ............................. 2000-170676

(51) Int. Cl.
G06F 3/12      (2006.01)
G06F 15/00     (2006.01)

(52) U.S. Cl. .................. 358/1.15; 358/1.16; 348/207.2

(58) Field of Classification Search ................ 358/1.2, 358/1.9, 504, 474, 519, 1.15, 1.18, 1.1, 1.6, 358/1.13, 1.14, 1.16, 1.17, 407, 468, 302; 382/167, 276, 275; 396/319, 300, 310; 348/373, 348/207.1, 207.11, 207.2, 207.99

See application file for complete search history.

(56) References Cited

U.S. PATENT DOCUMENTS

| | | | | |
|---|---|---|---|---|
| 5,132,846 | A | * | 7/1992 | Estelle ........................ 359/676 |
| 5,293,208 | A | * | 3/1994 | Okano et al. .................. 355/55 |
| 6,115,137 | A | * | 9/2000 | Ozawa et al. ................. 358/1.6 |
| 6,259,537 | B1 | * | 7/2001 | Matama ....................... 358/1.9 |
| 6,259,825 | B1 | * | 7/2001 | Yamazaki .................... 382/276 |
| 6,317,156 | B1 | * | 11/2001 | Nagasaki et al. ............ 348/373 |
| 6,411,361 | B1 | * | 6/2002 | Hidaka et al. ................. 355/40 |
| 6,559,888 | B1 | * | 5/2003 | Doron ....................... 348/240.1 |
| 6,683,981 | B1 | * | 1/2004 | Matama ....................... 382/167 |

FOREIGN PATENT DOCUMENTS

JP    11-252500    9/1999

* cited by examiner

Primary Examiner—Dov Popovici
(74) Attorney, Agent, or Firm—Frishauf, Holtz, Goodman & Chick, P.C.

(57) ABSTRACT

A printer apparatus for effecting printing based on image data of a captured image includes an imaging condition detection unit for detecting an imaging condition of the captured image, a pre-print process unit for performing a pre-print process for the image data of the captured image in accordance with the imaging condition, and a print unit for effecting printing based on the image data processed by the pre-print process unit.

4 Claims, 5 Drawing Sheets

|  | IMAGING ZOOM | | |
|---|---|---|---|
|  | X1.0 | X2.0 | X3.0 |
| PRINT ZOOM X1.0 | ○ | ○ | ○ |
| PRINT ZOOM X1.5 | ○ | ○ | ○ |
| PRINT ZOOM X2.0 | ○ | ○ | × |
| PRINT ZOOM X2.5 | ○ | ○ | × |
| PRINT ZOOM X3.0 | ○ | × | × |

FIG. 5

PRINTING APPARATUS AND ELECTRONIC CAMERA

CROSS-REFERENCE TO RELATED APPLICATIONS

This application is based upon and claims the benefit of priority from the prior Japanese Patent Application No. 2000-170676, filed Jun. 7, 2000, the entire contents of which are incorporated herein by reference.

BACKGROUND OF THE INVENTION

The present invention relates to a printer apparatus and an electronic camera having a print mechanism.

At present, an electronic camera with a print function has been proposed, which prints a captured image on a self-development type film (print paper) such as an instant film. The electronic camera with the print function can trim and enlarge a predetermined area of the captured image at the time of printing (a print zoom process). In addition, the electronic camera can digitally enlarge a predetermined area within an imaging screen at the time of imaging (an imaging zoom process). In this way, the electronic camera with the print function can enlarge (zoom) the image at the time of both imaging and printing.

However, since either of the zoom processes is performed using image data prior to the zoom process, an image after the zoom process has a lower image quality than an image before the zoom process. Consequently, if a zoom process is performed at the time of imaging and a further zoom process is performed at the time of printing, the quality of the printed image may greatly deteriorate due to the synergetic effect of both processes.

On the other hand, when the ambience is dark, the electronic camera can effect imaging with the gain of a signal from an imaging element enhanced, that is, with an imaging sensitivity (ISO sensitivity) enhanced.

As described above, when imaging is effected with the enhanced ISO sensitivity, however, a noise component as well as a signal component increases. Thus, if an image captured with the enhanced ISO sensitivity is printed, the effect of noise increases, compared to the case where an image captured by normal imaging is printed, and the quality of the print image may deteriorate.

When both the imaging zoom process and print zoom process are performed, or when the image captured with the enhanced imaging sensitivity is printed, the quality of the print image may disadvantageously become lower than a desired image quality.

BRIEF SUMMARY OF THE INVENTION

The present invention has been made in consideration of the above problem in the prior art, and the object of the invention is to provide a printer apparatus and an electronic camera capable of preventing deterioration in image quality of a print image when an image subjected to the zoom process or an image captured with the enhanced imaging sensitivity is printed.

According to a first aspect of the invention, there is provided a printer apparatus for effecting printing based on image data of a captured image, the apparatus comprising: imaging condition detection means for detecting an imaging condition of the captured image; pre-print process means for performing a pre-print process for the image data of the captured image in accordance with the imaging condition; and print means for effecting printing based on the image data processed by the pre-print process means.

It is preferable that in the printer apparatus the imaging condition detection means detects the imaging condition on the basis of information added to the image data of the captured image.

According to a second aspect of the invention, there is provided a printer apparatus for effecting printing based on image data of a captured image, the apparatus comprising: imaging sensitivity detection means for detecting an imaging sensitivity used for the captured image; noise removal process means for performing a noise removal process for the image data of the captured image prior to the printing; and control means for controlling the noise removal process means in accordance with the imaging sensitivity.

It is preferable that in the printer apparatus the control means control the noise removal process means such that a noise removal performance is enhanced as the imaging sensitivity increases.

According to a third aspect of the invention, there is provided a printer apparatus for effecting printing based on image data of a captured image, the apparatus comprising: imaging zoom detection means for detecting a condition of use of an imaging zoom used for the captured image; print zoom means for enlarging an image to be printed on a print film; and control means for limiting a magnification of the image to be printed on the print film, in accordance with the condition of use of the imaging zoom.

According to a fourth aspect of the invention, there is provided an electronic camera comprising the printer apparatus of the first, second or third aspect of the invention and electronic imaging means, wherein the printer apparatus prints an image captured by the electronic imaging means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows a relationship between an imaging zoom magnification an d a print zoom magnification in the operation illustrated in FIG. 3.

DETAILED DESCRIPTION OF THE INVENTION

An embodiment of the present invention will now be described with reference to the accompanying drawings.

(Structure of Apparatus)

Figure 1:
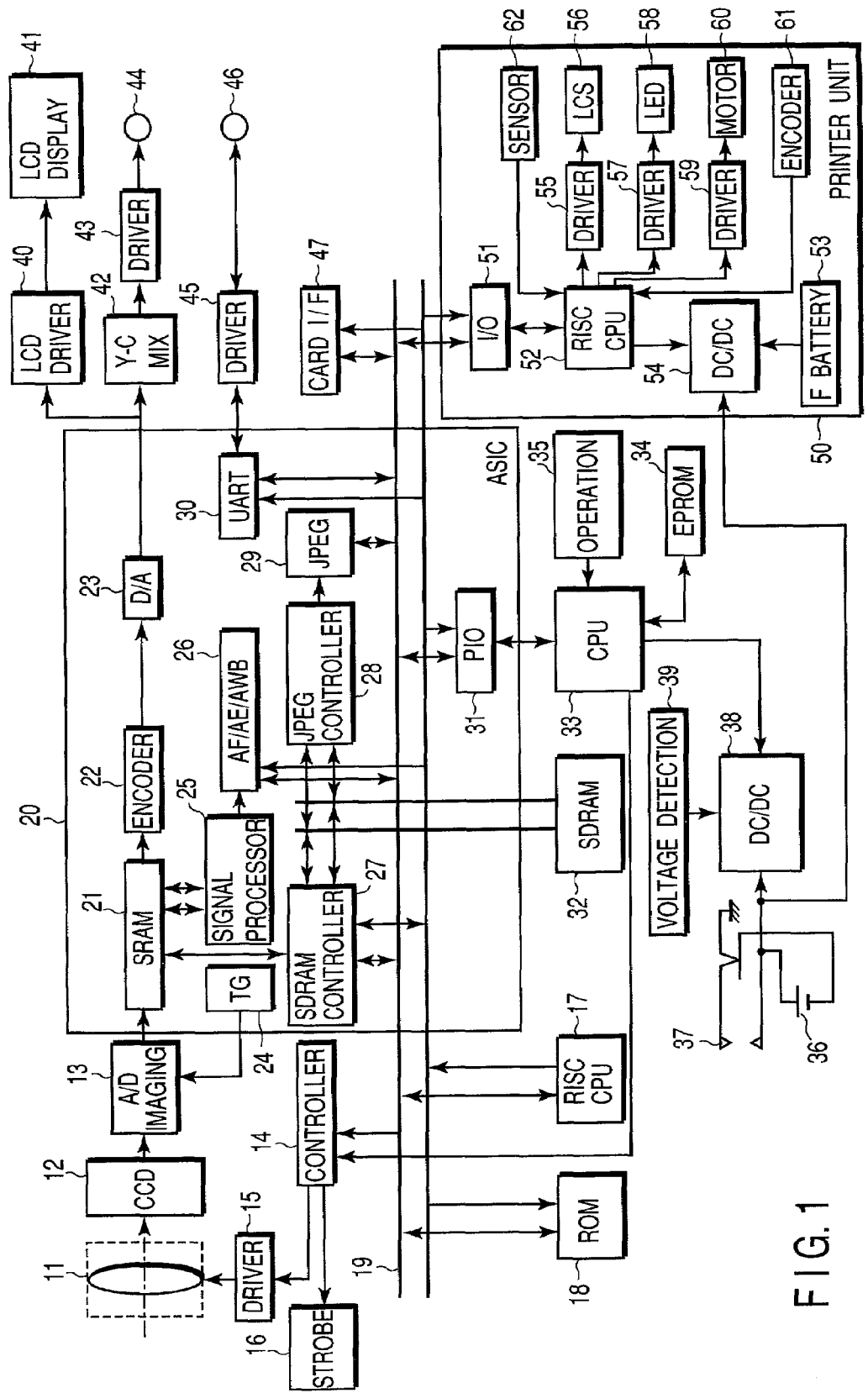
FIG. 1 is a block diagram showing an example of the structure of a printer-equipped electronic camera according to an embodiment of the present invention.

FIG. 1 is a block diagram showing an example of the structure of a printer-equipped electronic camera according to an embodiment of the present invention.

A basic structure of an imaging section is the same as that of an ordinary electronic camera, and it comprises a lens system 11, a CCD (imager device) 12, and an A/D conversion/imaging circuit 13. Specifically, a subject image focused by the lens system 11 is photoelectrically converted by the CCD 12, and the photoelectrically converted image signal is input to the A/D conversion/imaging circuit 13. Thus, a digitally converted image signal is obtained. The A/D conversion/imaging circuit 13 has a function of altering the gain of the analog image signal output from the CCD 12, that is, a function of altering ISO sensitivity. A lens of the lens system 11 is driven by a driver 15 under control of a controller 14. The controller 14 also has a function of controlling a strobe 16.

An RISC CPU 17 functioning as a main CPU performs a system control of the entirety of the electronic camera. A ROM (flash ROM) 18 stores programs for controlling the whole system. The individual parts of the electronic camera are connected over a bus 19, etc.

The RISC CPU 17 has functions such as a function of removing noise from an image, zoom process functions (an imaging zoom process function and a print zoom process function), a function of analyzing header information of image data, and pre-print process functions. The header information includes information on imaging conditions, such as information on ISO sensitivity at the time of imaging and information on a zoom magnification at the time of imaging. The pre-print process functions include a function of altering a noise removal performance according to ISO sensitivity, and a function of performing a trimming process at a print zoom magnification restricted according to an imaging zoom magnification.

An output from the A/D conversion/imaging circuit 13 is input to an ASIC section 20, which carries out various image processes, a JPEG compression/decompression process, etc. The ASIC section 20 comprises an SRAM 21 for receiving an image signal from the A/D conversion/imaging circuit 13; an encoder circuit 22 for encoding an signal from the SRAM 21; a D/A conversion circuit 23 for converting a signal from the encoder circuit 22 to an analog signal; a timing generator 24 for generating various timings for the A/D conversion/imaging circuit 13; a signal processor 25 and an AF/AE/AWB integrator 26 for performing an AF process, an AE process and an AWB process; an SDRAM controller 27 for controlling an SDRAM (to be described later); a JPEG controller 28 and a JPEG compression/decompression circuit 29 for performing a compression/decompression process; and a UART 30 and a PIO 31 functioning as interfaces.

An SDRAM 32 controlled by the SDRAM controller 27 is connected to the ASIC section 20. The SDRAM 32 functions as a buffer memory.

A CPU 33 is connected to the ASIC section 20 via the PIO 31, and an EPROM 34 is connected to the CPU 33. The CPU 33 functions as a sub-CPU and has functions such as a function of determining an input from an operation section 35 (comprising a release button, a print button, a mode selector switch, etc.), a function of controlling a power supply section, and a clock function.

An external power supply connected via an external power supply terminal 37, as well as a camera battery 36, can be used for the power supply of the electronic camera. A voltage supplied from the camera battery 36 or the external power supply is boosted by a DC/DC converter 38, and power is supplied to the respective parts of the electronic camera. The voltage of the camera battery 36 can be detected by a voltage detector 39.

An output from the D/A conversion circuit 23 of the ASIC section 20 is input to an LCD driver 40. The LCD driver 40 enables an LCD display 41 to display captured images, etc. The output from the D/A conversion circuit 23 is also input to a Y-C mix circuit 42. An output from the Y-C mix circuit 42 is sent to a driver 43, and an output from the driver 43 can be sent to the outside via a video-out terminal 44.

The ASIC section 20 is connected to a driver 45 via the UART 30 for communication with an external device via a serial interface terminal 46 for RS232C.

A card interface section 47 is connected to the bus 19. Image information is written in, and read out of, a memory card via the card interface section 47.

The above description relates mainly to the camera section of the printer-equipped electronic camera. A printer unit 50 of the printer-equipped electronic camera will now be described.

The printer unit 50 is connected to the bus 19. Image data, etc. is transmitted between the printer unit 50 and the camera section via an I/O convert section 51. A RISC CPU 52 is connected to the I/O convert section 51. The RISC CPU 52 controls individual parts of the printer unit 50.

A self-development type film such as an instant film is used for printing in the printer unit 50. A plurality of such films are contained in a detachable cartridge (film pack). The cartridge is equipped with a film battery 53 connected to a DC/DC converter 54. The power supply of the camera section is connected to the DC/DC converter 54.

At the time of printing, a driver 55 drives an LC shutter (LCS) 56, a driver 57 drives an LED 58, and a driver 59 drives a film feed motor 60. Thereby, an image is printed on a film in units of a line. The LC shutter 56 comprises a plurality of shutter portions for one line, and LEDs 58 (three primary colors of R, G and B) are provided in an array for each shutter portion. The opening time of each shutter portion of the LC shutter 56 is controlled in accordance with image information to vary an exposure amount by light from each LED 58. Thus, a line-by-line image is formed on the film.

The printer unit 50 includes an encoder 61 and a sensor section 62 for acquiring various information on a film feed state, a film position detection, etc.

(Operation)

The operations of the printer-equipped electronic camera according to the embodiment will now be described with reference to flow charts of FIGS. 2 to 4.

Figure 2:
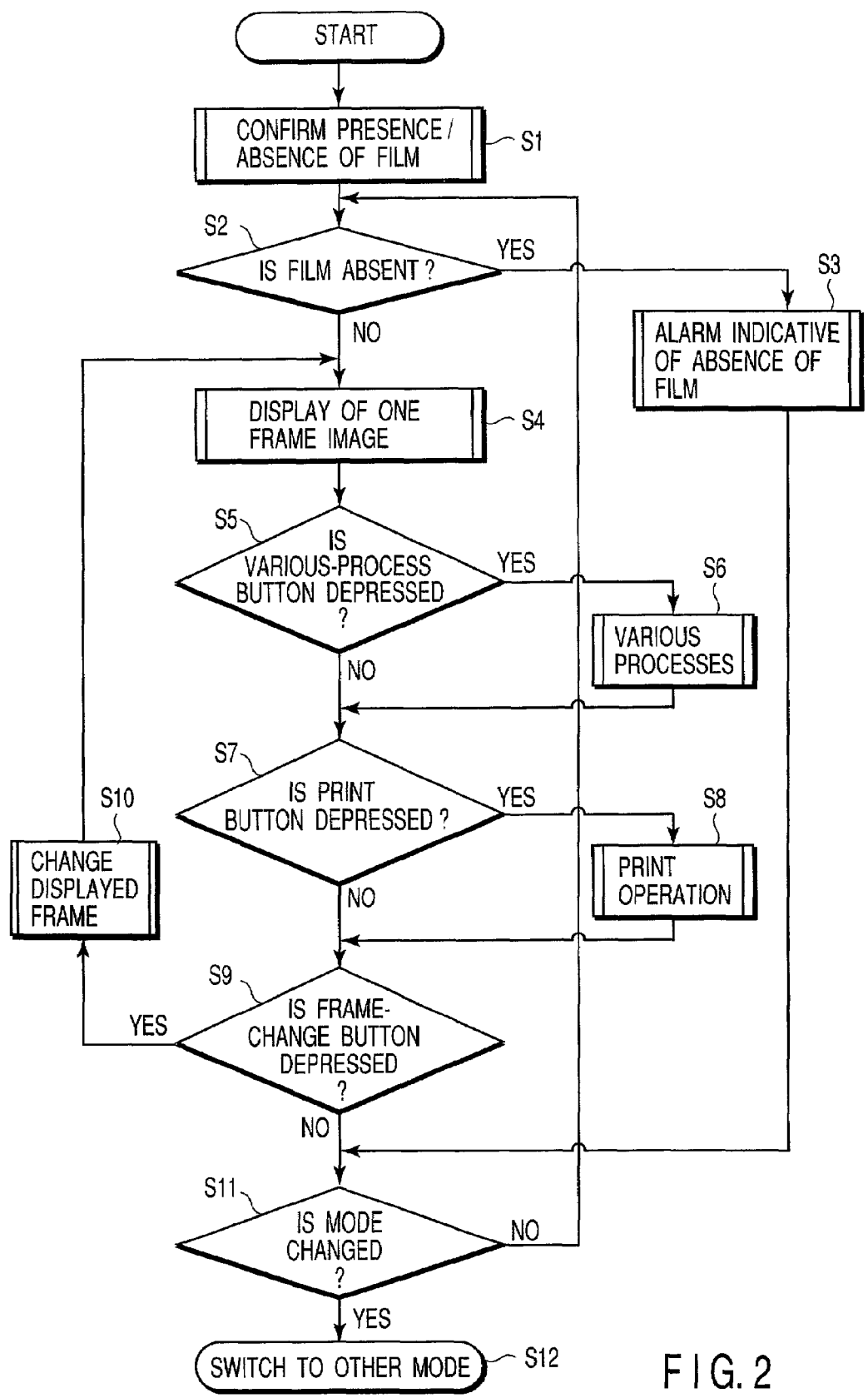
FIG. 2 is a flow chart illustrating an example of the operation of the printer-equipped electronic camera according to the embodiment of the invention.

FIG. 2 is a flow chart illustrating an operation when a print mode is set.

To start with, the presence/absence of a film is confirmed (S1). If there is no film (S2), the LCD display 41 displays an alarm indicative of the absence of a film (S3). If there is a film, the LCD display 41 displays a one-frame image (S4).

Subsequently, it is determined whether a various-process button has been depressed (S5). If the button has been depressed, various processes (to be described later) (mainly processes relating to an imaging zoom and a print zoom) are performed (S6). It is then determined whether a print button has been depressed (S7). If the print button has been depressed, a print operation (to be described later) (e.g. a noise removal process according to ISO sensitivity and an actual print execution process) is carried out (S8).

Subsequently, when a frame change button has been depressed (S9), the frame displayed on the LCD display 41 is changed (S10) and the control returns to step S4. If a mode has been changed (S11), a process of a switched mode is started (S12).

Figure 3:
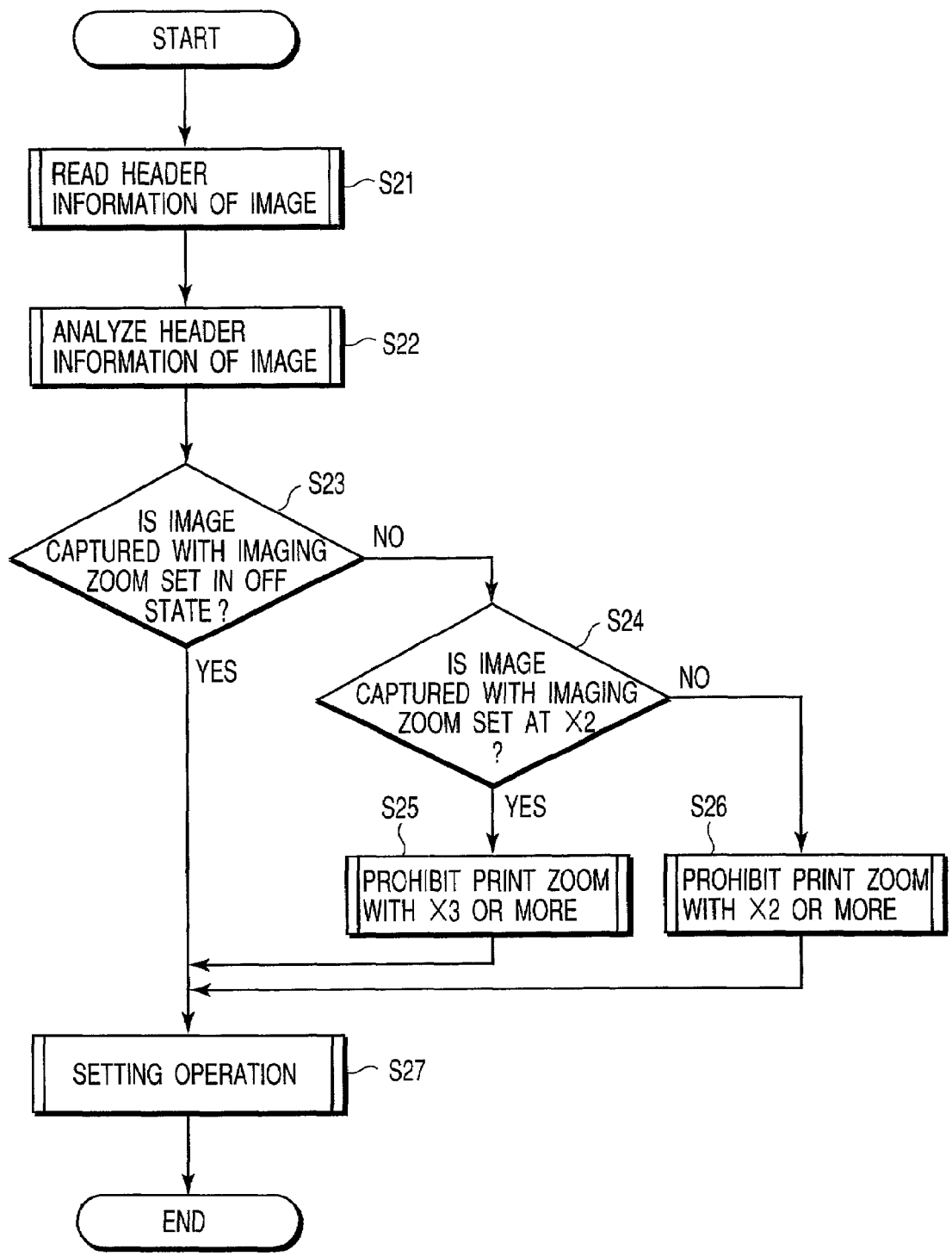
FIG. 3 is a flow chart illustrating an example of the operation of the printer-equipped electronic camera according to the embodiment of the invention.

FIG. 3 is a flow chart illustrating detailed operations in the various processes (S6) shown in the flow chart of FIG. 2. In this example, assume that the magnification of the imaging zoom (digital-telescope) can be set at one of three magnifying powers of 1, 2 and 3, the magnification of the print zoom can be set at one of five magnifying powers of 1, 1.5, 2, 2.5 and 3.

To start with, header information of the image data is read (S21), and the header information is analyzed (S22). Based on the header information, it is determined whether an image is captured with the imaging zoom set in the off-state (×1) (S23). If not, it is determined whether the image is captured with the imaging zoom set at the magnifying power of 2 (S24).

If the image is captured with the imaging zoom set at the magnifying power of 2, it is prohibited to set the magnifying power of the print zoom at 3 or more (S25). If not, i.e. if the image is captured with the imaging zoom set at the magnifying power of 3, it is prohibited to set the magnifying power of the print zoom at 2 or more (S26). In this way, the magnifying power of the print zoom is set with limitations according to the magnification of the imaging zoom (S27).

FIG. 5 shows print zoom magnifications selectable according to the imaging zoom magnification in the setting operation. As is understood from this Figure, all of the five print zoom magnifications are applicable to the image captured with the imaging zoom set in the off-state (×1). The magnifying power of 3 of the print zoom is prohibited for the image captured with the magnifying power of the imaging zoom set at 2 (×2). The magnifying power of 2 or more of the print zoom is prohibited for the image captured with the magnifying power of the imaging zoom set at 3 (×3). In short, the product of the imaging zoom magnification and the print zoom magnification is set to be less than 6, and the setting of the print zoom magnification, which results in the product of 6 or more, is rejected.

According to this example, the selectable range of print zoom magnifications is limited in accordance with the imaging zoom magnification. It is thus possible to prevent the problem of great degradation in quality of a print image, which results from a synergetic effect of an image quality degradation due to the imaging zoom process and an image quality degradation due to the print zoom process.

Figure 4:
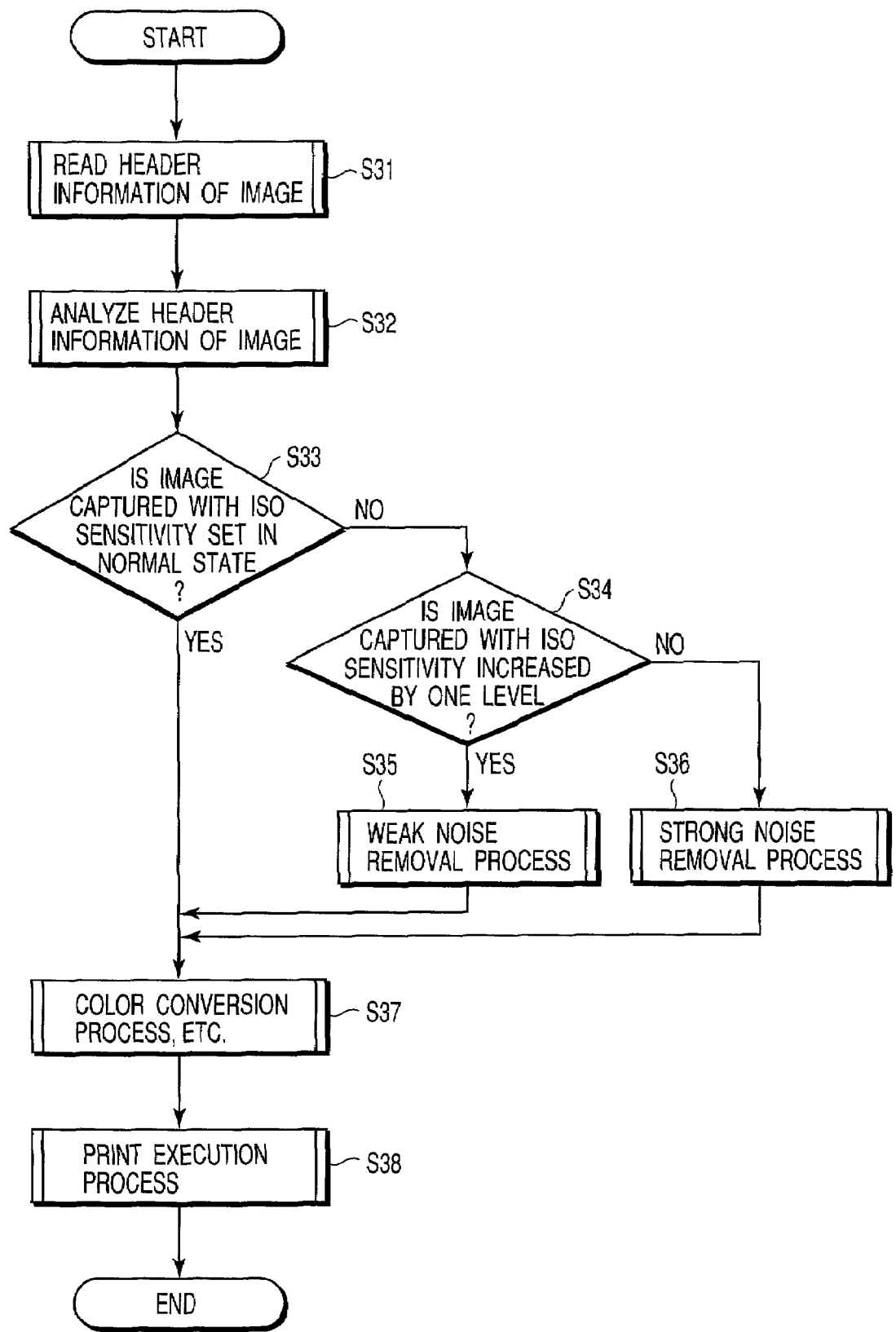
FIG. 4 is a flow chart illustrating an example of the operation of the printer-equipped electronic camera according to the embodiment of the invention.

FIG. 4 is a flow chart illustrating the details of the print operation (S8) in the flow chart of FIG. 2.

To begin with, header information of the image data is read (S31), and the header information is analyzed (S32). Based on the header information, it is determined whether an image is captured with the ISO sensitivity set in a normal state (e.g. ISO sensitivity 100) (S33). If not, it is determined whether the image is captured with the ISO sensitivity increased by one level (e.g. ISO sensitivity 200) (S34).

When the image is captured with the ISO sensitivity increased by one level, a noise removal process with a relatively weak (low) removal performance is carried out (S35). If not, i.e. if the image is captured with the ISO sensitivity increased by two or more levels (e.g. ISO sensitivity 400 or more), a noise removal process with a relatively strong (high) removal performance is conducted (S36).

Following the step S33, S35 or S36, a process necessary for executing printing, such as a color conversion process (color conversion from YUV to RGB), is performed (S37) and an actual print operation is executed (S38).

The noise removal process is, for example, a low-pass filter type noise removal process, or a dot-correlation detection type noise removal process.

The low-pass filter type process makes use of the fact that a noise component is in general distributed in a high-frequency region. Thereby, both a luminance component and a chromatic component are subjected to a low-pass filter process. Thus, the S/N ratio is enhanced. In this case, to enhance (increase) the noise removal performance means to lower the cut-off frequency of the low-pass filter. The low-pass filter type process is advantageous in that the process time is made substantially constant irrespective of the intensity of the processing, but the high-frequency component is uniformly cut. Consequently, the resolution of the image is not good, and the resolution deteriorates as the noise removal performance is enhanced.

The dot-correlation detection type process makes use of the fact that a noise component generally appears at random, and subjects both a luminance component and a chromatic component to a matrix process. A noise component is specified from the correlation between adjacent pixel components, and the specified component is attenuated. Thereby, the S/N ratio is enhanced. Normally, this process is performed in combination with the low-pass filter type process. In this case, to enhance (increase) the noise removal performance means to recognize the correlation in a wider range, i.e. to increase the number of pixels for examining the correlation. Compared to the low-pass filter type process, the dot-correlation detection type process is advantageous in that the noise component can be removed without lowering the resolution. However, the scale of processing is large, and a great deal of processing time is needed. The processing time increases disadvantageously, in proportion to the noise removal performance.

As has been described above, the noise is decreased as the noise removal performance is enhanced. On the other hand, problems such as degradation in resolution and an increase in processing time will arise. In the present example, when a noise component, which increases in accordance with the enhancement of the ISO sensitivity at the time of imaging, is removed, the noise removal performance is altered according to the ISO sensitivity. Thus, the noise component can be effectively reduced while preventing the above-mentioned problems, and a degradation in image quality of a print image can be suppressed.

According to the embodiment of the present invention, an image captured through a process such as a zoom process or an imaging sensitivity enhancement process is subjected to a pre-print process according to the process condition, thereby a degradation in image quality of a print image can be suppressed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A printer apparatus for printing an image based on image data of an image captured by an electronic camera, the apparatus comprising:

imaging condition detection means for detecting imaging sensitivity information set by the electronic camera;

pre-print process means for performing a pre-print process for the image data of the captured image in accordance with the imaging sensitivity information; and print means for printing the image based on the image data processed by the pre-print process means;

wherein the imaging condition detection means detects the imaging sensitivity information from header information of the image data.

2. A printer apparatus for effecting printing based on image data of a captured image, the apparatus comprising:

imaging sensitivity detection means for detecting an imaging sensitivity used for the captured image;

noise removal process means for performing a noise removal process for the image data of the captured image prior to the printing; and control means for controlling the noise removal process means in accordance with the imaging sensitivity.

3. A printer apparatus according to claim 2, wherein the control means controls the noise removal process means such that a noise removal performance is enhanced as the imaging sensitivity increases.

4. An electronic camera comprising:

the printer apparatus of claim 2; and electronic imaging means for electronically capturing an image, wherein the printer apparatus prints the image captured by the electronic imaging means.

* * * * *